US010136243B2

(12) United States Patent
Shen

(10) Patent No.: US 10,136,243 B2
(45) Date of Patent: Nov. 20, 2018

(54) SYSTEM AND METHOD FOR CREATING MOBILE APPLICATION STORE

(71) Applicant: Qiongmao Shen, Shenzhen (CN)

(72) Inventor: Qiongmao Shen, Shenzhen (CN)

( * ) Notice: Subject to any disclaimer, the term of this patent is extended or adjusted under 35 U.S.C. 154(b) by 344 days.

(21) Appl. No.: 14/895,713

(22) PCT Filed: May 26, 2014

(86) PCT No.: PCT/CN2014/078383
§ 371 (c)(1),
(2) Date: Apr. 11, 2016

(87) PCT Pub. No.: WO2014/194774
PCT Pub. Date: Dec. 11, 2014

(65) Prior Publication Data
US 2016/0227343 A1      Aug. 4, 2016

(30) Foreign Application Priority Data

Jun. 4, 2013   (CN) .......................... 2013 1 0219017

(51) Int. Cl.
*H04W 4/00* (2018.01)
*G06F 8/61* (2018.01)
(Continued)

(52) U.S. Cl.
CPC .............. *H04W 4/003* (2013.01); *G06F 8/61* (2013.01); *H04L 67/06* (2013.01); *H04L 67/34* (2013.01); *H04W 4/60* (2018.02)

(58) Field of Classification Search
CPC .................................................. H04W 4/003
See application file for complete search history.

(56) References Cited

U.S. PATENT DOCUMENTS

| 2011/0161912 | A1* | 6/2011 | Eteminan | G06F 8/20 |
| | | | | 717/101 |
| 2013/0247005 | A1* | 9/2013 | Hirsch | G06F 8/71 |
| | | | | 717/121 |
| 2014/0109072 | A1* | 4/2014 | Lang | G06F 8/52 |
| | | | | 717/168 |

FOREIGN PATENT DOCUMENTS

| CN | 101959179 | 1/2011 |
| CN | 102467387 | 5/2012 |

(Continued)

OTHER PUBLICATIONS

International Search Report for PCT/CN2014/078383, dated Sep. 3, 2014, and English language translation, 4 pages total.

*Primary Examiner* — Suraj M Joshi
(74) *Attorney, Agent, or Firm* — Hamre, Schumann, Mueller & Larson, P.C.

(57) ABSTRACT

A system and method for creating mobile application store are disclosed. The system includes a mobile application support system including an application supply module, wherein the application supply module is configured to supply a mobile application file to a respective mobile application store, the mobile application file is a mobile application file obtained from a mobile application being processed in a processing manner corresponding to types of mobile application store, supported mobile device operating system and mobile application, and then supplied to the respective mobile application store, including the identification information of the mobile application store, or a mobile application file capable of acquiring the identification information of the mobile application store when the mobile application file is supplied to the mobile application store or is supplied to a mobile terminal store through the mobile application store, and the mobile application identifies the mobile application store where the mobile applica- (Continued)

tion is, according to the identification information of the mobile application store. The present disclosure can create a mobile application store easily and improve efficiency in the release and application of the mobile application.

16 Claims, 10 Drawing Sheets

(51) Int. Cl.
*H04L 29/08* (2006.01)
*H04W 4/60* (2018.01)

(56) References Cited

FOREIGN PATENT DOCUMENTS

| CN | 102629194 | 8/2012 |
| CN | 103279355 | 9/2013 |

\* cited by examiner

Application Submission

Application Type:
- ☐ Android Application — Upload APK
- ☐ Windows Phone Application — Upload App
- ☐ HTML5 Multi-platform Application — HTML5 Application Link
- ☐ Others Choose Application Type: Type Fill in App Introduction:

Upload App Icon: Upload

Upload App Screen Capture: Upload  Upload

Whether to Integrate Membership System: ☐ Yes  Please Download SDK
☐ No

Whether to Intervene In-app Payment: ☐ Yes  Please Download SDK
☐ No

Download: Software Development Toolkit

Release Area Limit:

Copyright Protection:

Cancel  Submit

FIG. 10

Request for Creating Mobile Application Store

Fill In the Following Information

1. Destination For Creating A Mobile Application Store Website

[                              ]

Reference: http://www.operator domain name.com
   http://store.operator domain name.com
   http://www.operator domain name/store 2. Type of Mobile Application Store
   - ☐ Website Type
   - ☐ Website added with an assisted store assistant mobile 3. Whether mobile application store is required to access to your membership system
   - ☐ Yes
   - ☐ No 4. Whether specific mobile application is required to access to your membership system
   - ☐ Yes
   - ☐ No 5. Type of the covered mobile device
   - ☐ IOS
   - ☐ Android
   - ☐ Windows Phone
   - ☐ Others

[ Cancel ]   [ Submit ]

FIG. 12

SYSTEM AND METHOD FOR CREATING MOBILE APPLICATION STORE

FIELD

The present disclosure generally relates to the field of internet technology, and specifically to a system for creating mobile application store and a method for creating mobile application store.

BACKGROUND

A mobile application (referred to mobile app for short) also called as mobile phone application or mobile phone app etc., is referred to a software application designed for smart phone, table PC or other mobile devices, generally including game, music, finance, tool, sport, education, travel, reference, newspaper or magazine, life and other software applications. Generally, the mobile application developed by a mobile application developer is released on a certain mobile application platform to allow an intelligent terminal user to download and use, and such a mobile application platform can be generally referred as mobile application store.

Currently, there are four main types of mobile application stores, including: a built-in mobile application store (such as App Store of Apple or Google Play of Google) provided by a provider of the mobile intelligent terminal device operating system; a mobile application store of manufacturer's brand preloaded in the device by intelligent terminal device manufacturer, particularly mobile phone manufacturer; a mobile application store provided by a telecom operator; and a mobile application store (such as Getjar.com or hiapk.com) for the user of an open mobile device operating system (such as Android, BlackBerry, Symbian or Brew) provided by an internet service provider.

With the rapid development of the mobile internet and the increasing amount of mobile internet users, the mobile intelligent terminal device plays a important role in people's life, therefore, the internet service provider keeps on finding a better way to meet the needs of mobile internet users. Since the mobile application store comprises respective kinds of popular mobile applications, on one hand, the open mobile device operating system occupies a larger market share, and on the other hand, it is possible for mobile application store operator to provide HTML5 web mobile application for a closed mobile device operating system through the mobile application store as the rise in HTML5 web mobile application, more and more internet service providers join the mobile application store operators.

There are generally two kinds of implementations of creating a mobile application store in the prior art. One is to provide a specific mobile application store solution by a specific mobile application store solution provider for a mobile application store operator client, such as telecom operator, or mobile phone manufacturer. The above implementation often cannot meet the needs of the mobile application store operator client (such as internet service provider), because for example when the mobile application store operator client asks for sharing earnings from an in-app billing of a specific mobile application (especially for example, gaming mobile application), or asks for the user to log in the specific mobile application by using the membership system of the mobile application store operator client directly, the solution generally requires the mobile application developer to conduct different or multiple developments for different mobile application store operator clients. However, the mobile application developer tends not to pay much time and effort for a small mobile application store of a new or small mobile application store operator. The other is to develop a mobile application store by the mobile application store operator (such as internet service provider) itself, introduce a mobile application through a negotiation with the application developer, and place the mobile application on the mobile application store so that the user can download it to use. However, the small and middle sized mobile application store operator has no enough manpower, resources and financial resources to develop the mobile application store and negotiate with the application developer, thus the above implement greatly improves creation cost of the mobile application store. Moreover, as the same as the first implement, the mobile application developer tends not to pay much time and effort to access for a mobile application store of a new or small mobile application store operator. Accordingly it cause the creation of the mobile application store inefficient, which seriously restricts and affects the development of the mobile application store and the mobile application service.

SUMMARY

Based on above, the objective of the present disclosure is to provide a system for creating mobile application store and a method for creating mobile application store to overcome the defects of the prior art, which can create a mobile application store easily and improve efficiency in the release and application of the mobile application.

In order to achieve the above objective, the present disclosure adopts the following technical solution.

A system for creating mobile application store, including a mobile application support system, wherein the mobile application support system includes an application supply module; and the application supply module is configured to supply a mobile application file to a respective mobile application store, the mobile application file is a mobile application file obtained from a mobile application being processed in a processing manner corresponding to types of mobile application store, supported mobile device operating system and mobile application, and then supplied to the respective mobile application store, the mobile application file includes identification information of the mobile application store, or the mobile application file is capable of acquiring the identification information of the mobile application store when the mobile application file is supplied to the mobile application store or is supplied to a mobile terminal through the mobile application store, and the mobile application identifies the mobile application store where the mobile application is located, according to the identification information of the mobile application store.

A system for creating mobile application store, including a mobile application store support system, wherein the mobile application store support system includes mobile application store modules deployed on one or more destinations; and the mobile application store module is configured to provide a mobile application service, the mobile application service includes supplying a corresponding mobile application file for a sender of a download instruction when receiving the download instruction, and the mobile application file includes identification information of a mobile application store corresponding to the mobile application store module, or acquires the identification information of the mobile application store through the mobile application.

A method for creating mobile application store, including:

supplying a mobile application file to a respective mobile application store, wherein the mobile application file is a mobile application file obtained from a mobile application being processed in a processing manner corresponding to types of mobile application store, supported mobile device operating system and mobile application, and then supplied to the respective mobile application store, the mobile application file includes identification information of the mobile application store, or the mobile application file is capable of acquiring the identification information of the mobile application store when the mobile application file is supplied to the mobile application store or is supplied to a mobile terminal through the mobile application store, and the mobile application identifies the mobile application store where the mobile application is, according to the identification information of the mobile application store.

A method for creating mobile application store, including:

providing a mobile application service through respective mobile application store modules deployed on one or more destinations, the mobile application service includes supplying a corresponding mobile application file for a sender of a download instruction when receiving the download instruction, and the mobile application file includes identification information of a mobile application store corresponding to the mobile application store module, or acquires the identification information of the mobile application store through the mobile application.

According to the system and method for creating mobile application store in the present disclosure, the mobile application can be processed as a mobile application file corresponding to respective mobile application stores based on the type of each mobile device operating system, the type of the mobile application and the type of the mobile application store. In addition, the identification information of the corresponding mobile application store can be identified based on the mobile application file, to realize the association between the mobile application file and the mobile application store, which results in convenient for recording the related information for example the in-app billing during the user using the mobile application without negotiating and processing for each information so that the mobile application store can be easily created and efficiency in the release and application of the mobile application can be improved.

BRIEF DESCRIPTION OF THE DRAWINGS

FIG. 10 is a schematic diagram illuminating a mobile application submission page according to one specific embodiment.

FIG. 12 is a schematic diagram illuminating a mobile application store creation page according to one specific embodiment.

DETAILED DESCRIPTION OF THE PREFERRED EMBODIMENTS

The objective, technical solutions and advantages of the present disclosure may be best understood by reference to the following description taken in conjunction with the accompanying drawings. It is to be understood that the embodiments described herein are only intended to explain the present disclosure, but not to limit the scope.

For illustration purposes, the following description will illustrate embodiments of the system for creating mobile application store according to the present disclosure first, and then illustrate embodiments of the method for creating mobile application store according to the present disclosure.

Example One

Figure 1:
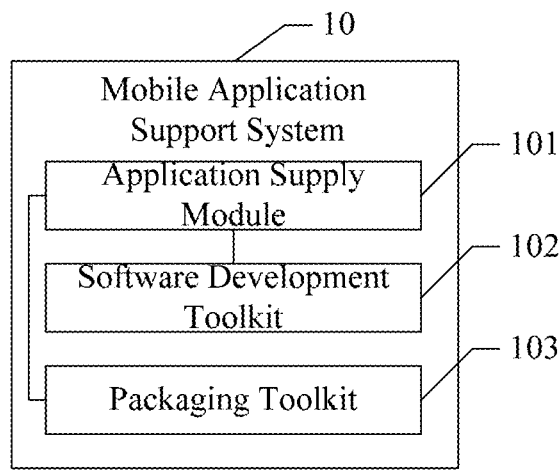
FIG. 1 is a structural schematic diagram illuminating a system for creating mobile application store according to Example One of the present disclosure.

FIG. 1 is a structural schematic diagram of a system for creating mobile application store according to Example One of the present disclosure. As shown in FIG. 1, a system for creating mobile application store according to Example One includes a mobile application support system 10.

As shown in FIG. 1, the mobile application support system 10 includes an application supply module 101. The mobile application supply module 101 is configured to supply a mobile application file to a respective mobile application store, the mobile application file is a mobile application file obtained from a mobile application being processed in a processing manner corresponding to types of mobile application store, supported mobile device operating system and mobile application, and then supplied to the respective mobile application store, the mobile application file includes identification information of the mobile application store, or the mobile application file is capable of acquiring the identification information of the mobile application store when the mobile application file is supplied to the mobile application store or is supplied to a mobile terminal through the mobile application store, and the mobile application identifies the mobile application store where the mobile application is, according to the identification information of the mobile application store. The time of dealing with the corresponding processing manners may be different based on requirements of practical applications, including but not limited to one or any combination of: the time of receiving the submitted mobile application, the time of creating the mobile application store and the time of initiating a download request by a user in the mobile application store. Moreover, the identification information of the mobile application store includes but is not limited to: a store ID for identifying a mobile application store with a different brand and/or different membership system.

The above corresponding processing manner may be different based on the type of the mobile device operating system, the type of the mobile application and the type of the mobile application store. A software development toolkit 102 or a packaging toolkit 103 may be provided within the mobile application support system 10 accordingly, and several implements are illuminated as below.

In one embodiment, the mobile application support system 10 includes a software development toolkit 102. The type of the mobile device operating system includes an open operating system. The type of the mobile application includes a normal mobile application. The corresponding processing manner includes: packaging, by the application supply module 101, the identification information of the mobile application store and the mobile application to a mobile application file corresponding to a respective mobile application store after the mobile application integrated into various interfaces of the software development toolkit 102 without differences in mobile application store operator or mobile application store once, storing, by the mobile application file, the identification information of the mobile application store corresponding to the mobile application or both of identification information of the mobile application and the identification information of the mobile application store corresponding to the mobile application in a mobile device memory when the mobile application file being installed, and reading, by the software development toolkit 102, the identification information of the corresponding mobile application store from the mobile device memory, or reading the identification information of the corresponding mobile application store from the mobile device memory based on the identification information of the mobile application, to identify the mobile application store where the mobile application is, when the respective interface of the software development toolkit 102 is called. The various interfaces of the software development toolkit 102 includes but is not limited to an in-app billing interface, a user interface, a DRM interface, and a version updating interface. The package includes but is not limited to: writing the identification information of the mobile application store into a file name and renaming for the mobile application file, or unpacking the mobile application and writing the identification information of the mobile application store into a configuration file unpacked, and repacking related files to generate the mobile application file, wherein the related files include the configuration file and other unpacked files.

In another implementation, the mobile application support system 10 further includes a packaging toolkit 103. The type of the mobile device operating system includes an open operating system. The type of the mobile application includes a normal mobile application. At this time, the above corresponding processing manner includes: packaging, by the application supply module 101, the identification information of the mobile application store, the mobile application and the packaging toolkit 103 to as a mobile application file corresponding to a respective mobile application store, storing, by the mobile application file, the identification information of the mobile application store corresponding to the mobile application or both of identification information of the mobile application and the identification information of the mobile application store corresponding to the mobile application in a mobile device memory when the mobile application file being installed, and reading, by the packaging toolkit 103, the identification information of the corresponding mobile application store from the mobile device memory, or reading the identification information of the corresponding mobile application store from the mobile device memory based on the identification information of the mobile application, to identify the mobile application store where the mobile application is, when the respective interface of the packaging toolkit 103 is called. The packaging includes but is not limited to writing the identification information of the mobile application store into a file name and renaming for the mobile application file, and/or unpacking the mobile application and writing the identification information of the mobile application store into a configuration file unpacked, and repacking related files to generate the mobile application file, wherein the related files may include the configuration file, other unpacked files and the packaging toolkit 103.

In another implementation model, the mobile application support system 10 further includes a software development toolkit 102. The type of the mobile device operating system includes an open operating system. The type of the mobile application includes a normal mobile application. The type of the mobile application store includes a type of a website added with an assisted store assistant mobile application. At this time, the corresponding processing manner includes: supplying, by the application supply module 101, the mobile application to the mobile application store directly or after being signed by DRM after the mobile application integrated into various interfaces of the software development toolkit 102 without differences in mobile application store operator or mobile application store once, storing, by a store assistant mobile application of the mobile application store which is bound with a corresponding identification information of the mobile application store, the identification information of the mobile application store corresponding to the mobile application or both of identification information of the mobile application and the identification information of the mobile application store corresponding to the mobile application in a mobile device memory when installing the mobile application, and reading, by the software development toolkit 102, the identification information of the corresponding mobile application store from the mobile device memory, or reading the identification information of the corresponding mobile application store from the mobile device memory based on the identification information of the mobile application when the respective interface of the software development toolkit 102 is called, to identify the mobile application store where the mobile application is.

In another implementation, the mobile application support system 10 further includes a software development toolkit 102. The type of the mobile device operating system includes an open operating system or a closed operating system. The type of the mobile application includes a HTML5 webpage mobile application. At this time, the corresponding processing manner includes: integrating the mobile application into a HTML5 application user interface of the mobile application store after the mobile application integrated into various interfaces of the software development toolkit 102, transmitting, by the HTML5 application user interface, the identification information of the mobile application store to the mobile application, acquiring, by the software development toolkit 102, the identification information of the mobile application store when the respective interface of the software development toolkit 102 is called, to identify the mobile application store where the mobile application is. The HTML5 application user interface integrated into the mobile application store includes but is not limited to a HTML5 application page implanted into the mobile application store by an iframe approach.

In the system for creating mobile application store according to this embodiment, with the mobile application support system 10, the mobile application can be processed as a mobile application file corresponding to respective mobile application stores based on the type of each mobile device operating system, the type of the mobile application and the type of the mobile application store, only if the mobile application developer uploads the developed mobile application once without negotiating with the operator client of the respective mobile application store. In addition, the identification information of the corresponding mobile application store can be identified based on the mobile application file, to realize the association between the mobile application file and the mobile application store, which results in convenient for recording the related information for example the in-app billing during the user using the mobile application.

Example Two

Figure 2:
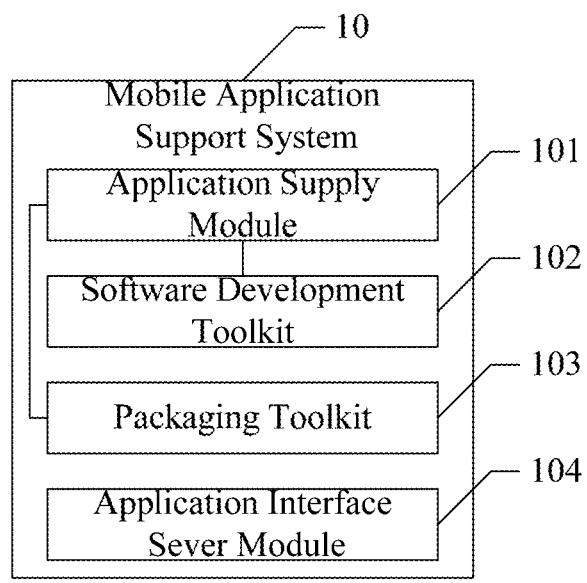
FIG. 2 is a structural schematic diagram illuminating a system for creating mobile application store according to Example Two of the present disclosure.

FIG. 2 is a structural schematic diagram illuminating a system for creating mobile application store according to Example Two of the present disclosure. As shown in FIG. 2, Example Two is different from Example One that the mobile application support system 10 in Example Two further includes an application interface server module 104.

As shown in FIG. 2, in Example Two, the mobile application support system 10 further includes an application interface server module 104 configured to connect various interfaces of the software development toolkit 102 and/or the packaging toolkit 103 to corresponding external system interfaces.

The connecting includes but is not limited to the following: receiving, by the in-app billing interface, the identification information of the mobile application store transmitted from the software development toolkit 102 and an in-app billing request information, calling a corresponding payment gateway based on the received identification information of the mobile application store and the in-app billing request information, receiving payment result information returned by the payment gateway, storing the payment result information to an information database and returning to the software development toolkit 102 based on the identification information of the mobile application store, returning, by the software development toolkit 102, the payment result information to the mobile application so that the mobile application supplies a product or service purchased by a user to the user according the payment result information. When the identification information of the mobile application store sent by software development toolkit 102 and the in-app billing request information belong to an in-app billing request initiated by the user in the mobile application received by the mobile application, reading, by the software development toolkit 102, the identification information of a corresponding mobile application store from the mobile device memory based on the identification information of the mobile application, and transmitting, through calling the in-app billing interface of the software development toolkit 102.

Example Three

Figure 3:
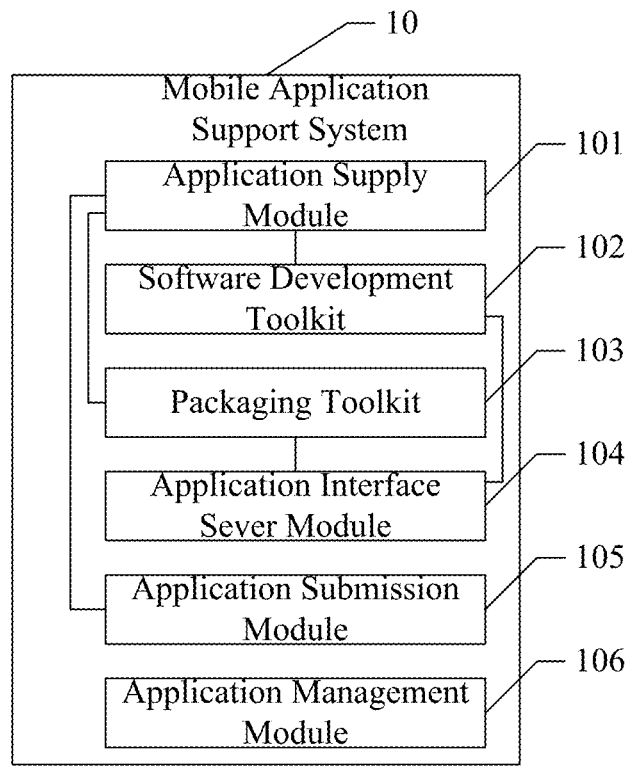
FIG. 3 is a structural schematic diagram illuminating a system for creating mobile application store according to Example Three of the present disclosure.

FIG. 3 is a structural schematic diagram illuminating a system for creating mobile application store according to Example Three of the present disclosure. As shown in FIG. 3, Example Three is different from Example Two that the mobile application support system 10 in Example Three further includes an application submission module 105.

As shown in FIG. 3, in one embodiment of Example Three, the mobile application support system 10 further includes an application submission module 105 configured to receive a mobile application submission request. The mobile application submission request includes the mobile application and configuration information corresponding to the mobile application. The application submission module 105 is further configured to store the mobile application and the corresponding configuration information to an information database. The configuration information includes a name of the mobile application and a type of the mobile application. When the type of the mobile application is HTML5 web page mobile application, the mobile application submission request further includes URL address information of the mobile application.

Moreover, as shown in FIG. 3, the mobile application support system 10 further includes an application management module 106. The application management module 106 is configured to receive a management request and manage the mobile application and related information and data of the mobile application based on the management request. The related information and data of the mobile application include but are not limited to related information and data of the in-app billing of the mobile application in the respective mobile application store. The management includes but is not limited to: receiving an in-app billing data report request of a respective mobile application store, reading all payment result information of corresponding mobile applications in respective mobile application stores from the information database based on the identification information of the mobile application included in the request, and generating a report.

Example Four

Figure 4:
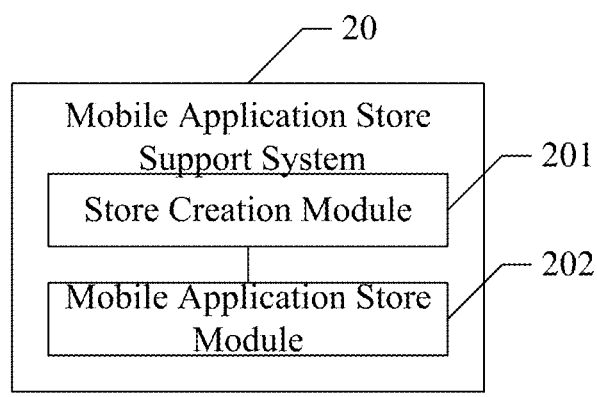
FIG. 4 is a structural schematic diagram illuminating a system for creating mobile application store according to Example Four of the present disclosure.

FIG. 4 is a structural schematic diagram illuminating a system for creating mobile application store according to Example Four of the present disclosure. As shown in FIG. 4, the mobile application support system in Example Four further includes a mobile application store support system 20.

As shown in FIG. 4, in Example Four, the mobile application store support system 20 includes mobile application store modules 202 deployed on one or more destinations (FIG. 4 illuminate an example of one mobile application store module 202 included).

The mobile application store module 202 is configured to provide a mobile application service. The mobile application service includes: supplying a corresponding mobile application file for a sender of a download instruction when receiving the download instruction. The mobile application file comprises identification information of a mobile application store corresponding to the mobile application store module 202, or acquires the identification information of the mobile application store through the mobile application.

As shown in FIG. 2, in this embodiment, the mobile application store support system 20 further includes a store creation module 201.

The store creation module 201 is configured to receive a mobile application store creation request. The mobile application store creation request includes mobile application store configuration information. The mobile application store configuration information may include any one or any combination of a type of the mobile application store, a destination where the mobile application store is deployed, a supported mobile device operating system, whether the mobile application store needs to be integrated into an internet provider membership system, whether the mobile application needs to be integrated into the membership system of the mobile application store operator, and whether the mobile application needs to be integrated into the in-app billing of the mobile application store. The store creation module is further configured to generate the mobile application store module 202 associated with the destination of the mobile application store based on the mobile application store creation request, and dispose the mobile application store module 202 to the destination of the mobile application store. The type of the mobile application store includes but is not limited to a website type and a type of a website added with an assisted store assistant mobile application.

Based on the solution of Example Two, the mobile application store module 202 may be generated based on the actual demand so that the store creation module 201 may create different mobile application store modules 202 for different network operator users. The different mobile application store modules 202 may be deployed as different mobile application stores, and the mobile application store modules 202 may provide mobile application services to the mobile terminal user respectively.

In one embodiment, the mobile application store module 202 is further configured to receive an access request, acquire information of a mobile application file corresponding to mobile application store module 202 based on the access request, the type of the mobile device operating system and/or the type of the mobile application store, and send the information of the mobile application file to a sender of the access request.

Example Five

Figure 5:
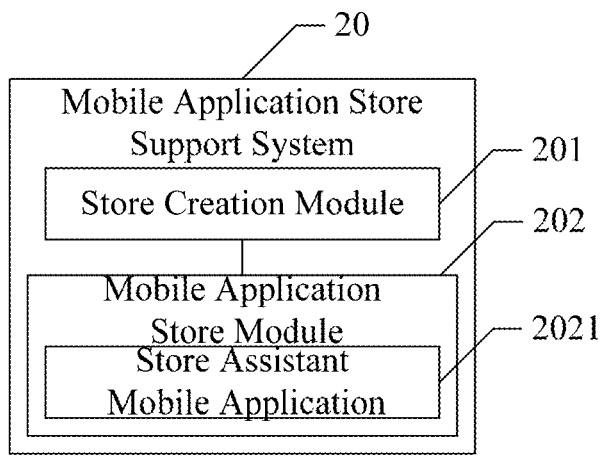
FIG. 5 is a structural schematic diagram illuminating a system for creating mobile application store according to Example Five of the present disclosure.

FIG. 5 is a structural schematic diagram illuminating a system for creating mobile application store according to Example Five of the present disclosure. As shown in FIG. 5, Example Five is different from Example Four that the mobile application store module 202 in Example Five further includes a store assistant mobile application 2021.

In the solution of this embodiment, the above store creation module 201 is further configured to create a store assistant mobile application 2021 corresponding to the mobile application store module 202 when the mobile application store type is the type of a website added with an assisted store assistant mobile application.

At this time, the mobile application store module 202 further includes a store assistant mobile application 2021, the store assistant mobile application 2021 is bound with the corresponding identification information of the mobile application store, the store assistant mobile application 2021 stores the identification information of the mobile application store corresponding to the mobile application or the identification information of the mobile application and the identification information of the corresponding mobile application store to the mobile device memory when installing the mobile application, and when a related interface is called through the mobile application, a software development toolkit integrated with the mobile application reads the identification information of the corresponding mobile application store from the mobile device memory, or reads the identification information of the corresponding mobile application store from the mobile device memory based on the identification information of the mobile application, to identify the mobile application store where the mobile application is.

Example Six

Figure 6:
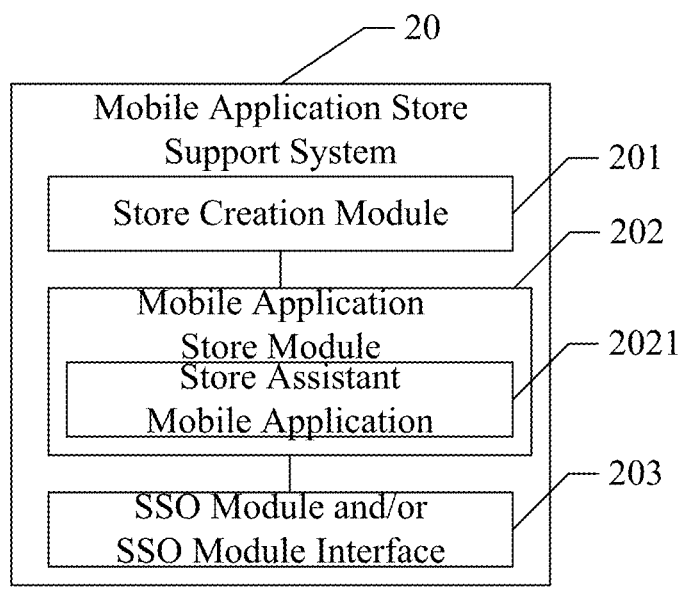
FIG. 6 is a structural schematic diagram illuminating a system for creating mobile application store according to Example Six of the present disclosure.

FIG. 6 is a structural schematic diagram illuminating a system for creating mobile application store according to Example Six of the present disclosure. As shown in FIG. 6, Example Six is different from Example Five that the mobile application store support system 202 in Example Six further includes a SSO module and/or a SSO module interface 203.

As shown in FIG. 6, in this embodiment, the mobile application store support system 20 further comprises a SSO module and/or a SSO module interface 203. The SSO module is configured to supply a user related service to a user when the mobile application store is configured to require the mobile application and/or the mobile application store to be integrated into a mobile application store operator membership system. The SSO module interface is provided by the mobile application store operator based on requirements of the SSO module to connect the SSO module and support the user related service to the user.

In this embodiment, the user related service includes any one or any combination of:

transmitting user related service request information to a user interface of software development toolkit and/or packaging toolkit when the mobile application initiates a request for user related service to the user, reading, by the software development toolkit and/or packaging toolkit, the identification information of the corresponding mobile application store from the mobile device memory, or reading the identification information of the corresponding mobile application store from the mobile device memory based on the identification information of the mobile application, transmitting the identification information of the mobile application store and the received user related service request information to a user interface of the SSO module, transmitting, by the SSO module, the user related service request information to a SSO module interface of a corresponding mobile application store operator based on the identification information of the mobile application store, and returning a result from the SSO module interface to the software development toolkit and/or packaging toolkit, returning, by the software development toolkit and/or packaging toolkit, the result to the mobile application, and the mobile application supply user related service to the user based on the returned result; the user related service request comprises any one or any combination of login, login authentication, user information inquiry and user registration; and transmitting, by the mobile application store module 202, a user related service request information to the SSO module or the SSO module interface 203 of a corresponding mobile application store operator when the mobile application store initiates a request for user related service, and supply a user related service to a user based on the returned result; and the user related request comprising any one or any combination of login, login authentication, user information inquiry and user registration.

Example Seven

Figure 7:
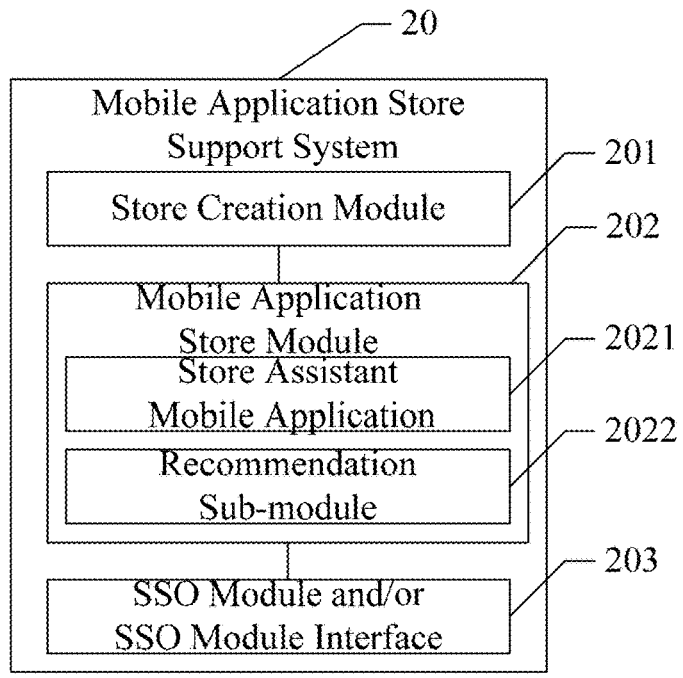
FIG. 7 is a structural schematic diagram illuminating a system for creating mobile application store according to Example Seven of the present disclosure.

FIG. 7 is a structural schematic diagram illuminating a system for creating mobile application store according to Example Seven of the present disclosure. As shown in FIG. 7, Example Seven is different from Example Six that the mobile application store support system 202 in Example Seven further includes a recommendation sub-module 2022.

As shown in FIG. 7, in this embodiment, the mobile application store module 202 further includes a recommendation sub-module 2022 configured to implant into a service of the mobile application store operator, and send information of recommended mobile application to a user through a recommendation algorithm according to the user's historical information; the service of the mobile application store operator comprises but is not limited to website, computer software and mobile application; the user's historical information comprises but is not limited to content of browsed page, browsing history, historical download record of mobile applications; and the recommendation algorithm comprises but is not limited to a mixed recommendation algorithm combined a recommendation algorithm based on content with a recommendation algorithm based on collaborative filtering.

Example Eight

Figure 8:
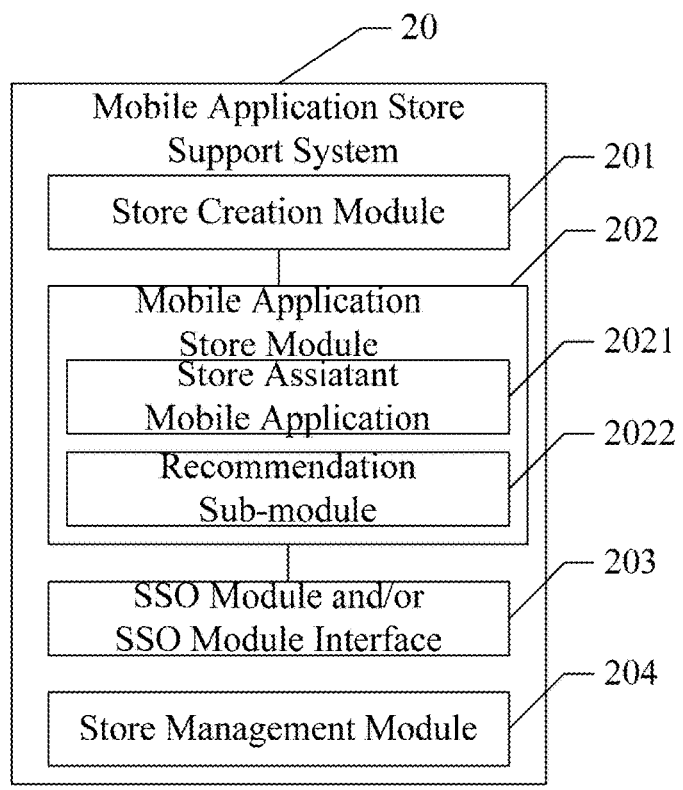
FIG. 8 is a structural schematic diagram illuminating a system for creating mobile application store according to Example Eight of the present disclosure.

FIG. 8 is a structural schematic diagram illuminating a system for creating mobile application store according to Example Eight of the present disclosure. As shown in FIG. 8, Example Eight is different from Example Seven that the mobile application store support system 202 in Example Eight further includes a store management module 204.

As shown in FIG. 7, in this embodiment, the mobile application store support system 20 further includes the store management module 204 configured to receive a management request and manage the mobile application store corresponding to the mobile application store module 202. The management request includes but is not limited to: inquiring in-app billing detail and/or summary information of a respective mobile application in the mobile application store corresponding to the mobile application store module 202, managing a subject of the mobile application store and pulling the mobile application on/off the shelves.

Example Nine

Figure 9:
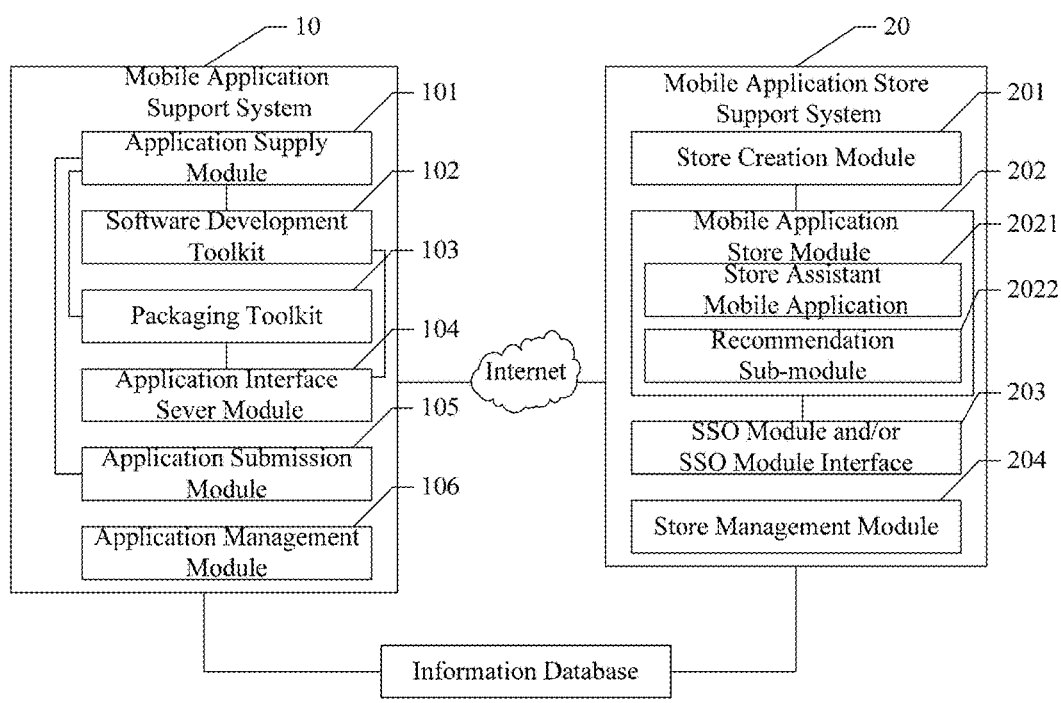
FIG. 9 is a structural schematic diagram illuminating a system for creating mobile application store according to Example Nine of the present disclosure.

FIG. 9 is a structural schematic diagram illuminating a system for creating mobile application store according to Example Nine of the present disclosure. As shown in FIG. 9, the system for creating mobile application store in Example Nine includes both a mobile application support system 10 and a mobile application store support system 20. The mobile application support system 10 and the mobile application store support system 20 can be coupled to each other over the network.

In Example Nine, the implementation of the mobile application support system 10 may be the same as that of any one of Examples One to Three, and the implementation of the mobile application store support system 20 may be the same as that of any one of Embodiment Four to Eight. Therefore, the mobile application support system 10 and the mobile application store support system 20 will not be described in detail. For illustrative purposes, as shown in FIG. 9, take the mobile application support system 10 in Example Three and the mobile application store support system 20 in Example Eight as an example. This example is only a exemplary embodiment, and does not limit the present disclosure.

One embodiment of the present disclosure will be described, in conjunction with the system for creating mobile application store in Embodiment Nine.

Based on the solution of the present disclosure, developers of the mobile application (including manufacturer, company, person and other developers which develop the mobile application) only need to supply the developed mobile application to the mobile application support system 10 according to the present disclosure, without developing a corresponding mobile application store themselves or coordinating with respective mobile application store operators whether they need to make the developed mobile application be available on the mobile application store or modify the mobile application according to requirements of respective mobile application stores, that is, they can process the mobile application as a mobile application file suited to a corresponding mobile application store to realize the release and support of the mobile application in multiple mobile application stores, based on the mobile application support system 10 according to the present disclosure.

The mobile application store operators to provide mobile application service or mobile application store may not develop the corresponding mobile application store themselves, and they can create a mobile application store of their own independently, quickly and conveniently, through the system for creating mobile application store according to the present disclosure, and can configure the mobile application file supplied to the user through the system for creating mobile application store according to the present disclosure.

In one embodiment, the specific processing procedure can be described as below.

The present disclosure may be best understood by reference to the following description taking a system for creating mobile application store including both the mobile application support system 10 and the mobile application store support system 20 as an example, in conjunction with a specific practical application scene, to illuminate several implements of the system for creating mobile application store according to the present disclosure. In the following exemplary description, an example of the mobile application developer side will be illuminated at first, and an example of the operator client side of mobile application service or mobile application store will be illuminated.

In one practical application scene, the mobile application developer may open a user account (hereafter referred as application developer account for the purpose of distinguish) by accessing the mobile application support system 10 of the present disclosure, and set related information associated with the application developer account, such as name, address and bank account of the application developer. The application developer account and related information of the application developer account can be stored in the information database. The specific process of opening the application developer account may use any means existing or to be developed and need not be repeated here.

Then, the mobile application developer may send a request of acquiring a mobile application submission page to the mobile application support system 10 according to the present disclosure through the application developer account. After receiving the request of acquiring the mobile application submission page, the mobile application support system 10 may return the mobile application submission page to the terminal where the application developer account is. FIG. 10 shows a schematic diagram illuminating the mobile application submission page fed back to the terminal where the application developer account is, and FIG. 10 shows a flow diagram illuminating a process of providing configuration information of the mobile application by an application developer based on the mobile application submission page accordingly.

Then, the application developer may submit the mobile application through mobile application submission page. In the mobile application submission page, the application developer may fill related configuration information according to requirements of the system, including a name of the mobile application, a type of the mobile application type (Android Application, Windows Phone Application, multi-platform HTML5 Application etc.), mobile application category, mobile application introduction, mobile application icon, mobile application screen capturing, release area limitation, a copyright protection option and so on. Send a mobile application submission request to the mobile application support system 10 after completing the filling in the information. The mobile application submission request includes the above configuration information.

The generated configuration information may be stored in the information database, convenient for the mobile application developer to modify, and for the mobile application store operator account to manage the mobile application, such as pull on/off shelves.

In case of the mobile application developer modifying the configuration information of the mobile application, the application developer account may send management request information to the mobile application support system 10 through the terminal where the application developer account is. The mobile application support system 10 may send the corresponding configuration information to the terminal where the application developer is according to the management request information. After the application developer account modifies the configuration information, such as modifying the type, name or figure of the mobile application, and sets the geographic area where is limited to release the mobile application. The configuration information may be returned to the mobile application support system 10, and the mobile application support system 10 may store the received updated configuration information in the information database.

Figure 11:
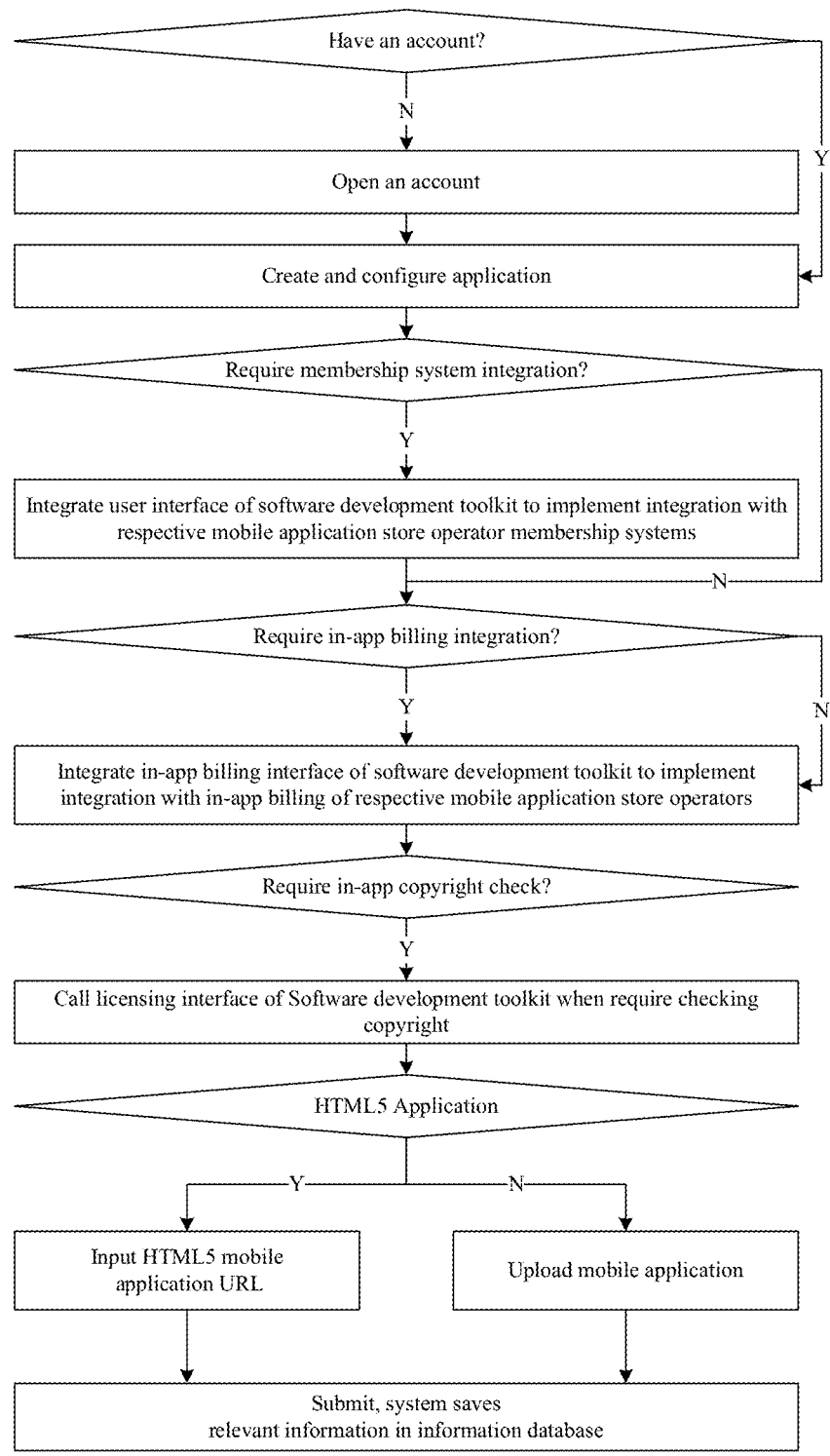
FIG. 11 is a flow diagram illuminating a process of providing configuration information of the mobile application based on the mobile application submission page shown in FIG. 10.

As shown in FIG. 11, when setting the configuration information related to the mobile application, if the mobile application needs to be integrated with respective mobile application stores, the mobile application developer may choose a corresponding software development toolkit 102, such as Objective-C software development toolkit, Java software development toolkit, JavaScript software development toolkit and so on, according to the development language and the type of the mobile device operating system type. Then access the standardized related interface provided by software development toolkit 102 to implement related functions, for example, a registration interface accessing the software development toolkit 102 by registration, a user authentication interface for user authentication, a login interface for login, and an accessing user information interface for acquiring user information, so that the user membership system of the mobile application store operator of all the mobile application store is accessible without accessing one by one.

If the mobile application is required to provide the detail of in-app billing and/or summary information of the users of the respective mobile applications, the mobile application may be integrated into the in-app billing interface of the software development toolkit 102 when a user initiates a request of in-app billing. The software development toolkit 102 may acquire the ID of the mobile application store where the mobile application is, with the support of the application supply module and the packaging toolkit 103, be coupled to the in-app billing interface of the application interface server module 104, and transmit the ID of the mobile application store and related parameters of the in-app billing. The application interface server module 104 is coupled to a corresponding payment gateway to finish the payment request, store related statistical data in the information database, and return the result to the software development toolkit 102. The software development toolkit 102 may return the result to the mobile application. If the payment is successful, the mobile application may supply the product and service purchased by a user to the user.

If the copyright of the mobile application is required to be checked, a Licensing interface provided by the software development toolkit 102 may be called.

If the type of the mobile application is HTML5 application, the URL of the HTML5 web page mobile application may be input.

After completing setting of the above configuration information, the above mobile application may be uploaded to the mobile application support system 10, and the mobile application support system may store the submitted mobile application and related information in the information database.

After the mobile application submission module 105 receives the submitted mobile application, the application supply module 101 may supply a corresponding application supply module 101 to each mobile application store. The mobile application file is a mobile application file obtained from a mobile application being processed in a processing manner corresponding to types of mobile application store, supported mobile device operating system and mobile application, and then supplied to a respective mobile application store by the application supply module 101. The mobile application file includes identification information of the mobile application store, or the mobile application file is capable of acquiring the identification information of the mobile application store through the mobile application to identify the mobile application store where the mobile application is, when the mobile application file is supplied to the mobile application store or is supplied to a mobile terminal through the mobile application store The specific processing procedures of the application supply module 101 when different mobile applications supplied to different mobile application stores are illuminated respectively as below, in conjunction with several embodiments.

In one embodiment, the mobile device operating system type includes an open operating system, and the type of the mobile application includes a normal mobile application. At this time, the above mobile application support system 10 further includes a software development toolkit 102. The above corresponding processing manner includes: packaging, by the mobile application module 101, the identification information of the mobile application store and the mobile application to a mobile application file corresponding to a respective mobile application store after the mobile application integrated into various interfaces of the software development toolkit 102 without differences in mobile application store operator or mobile application store once, storing, by the mobile application file, the identification information of the mobile application store corresponding to the mobile application or both of identification information of the mobile application and the identification information of the mobile application store corresponding to the mobile application in a mobile device memory when the mobile application file being installed, and reading, by the software development toolkit 102, the identification information of the corresponding mobile application store from the mobile device memory, or reading the identification information of the corresponding mobile application store from the mobile device memory based on the identification information of the mobile application, to identify the mobile application store where the mobile application is, when the respective interface of the software development toolkit 102 is called. The respective interface of the software development toolkit 102 includes but is not limited to an in-app billing interface and a user interface. The package includes but is not limited to: writing the identification information of the mobile application store into a file name and renaming for the mobile application file, or unpacking the mobile application and writing the identification information of the mobile application store into a configuration file unpacked, and repacking related files to generate the mobile application file, wherein the related files include the configuration file and other unpacked files.

In one embodiment, the type of the mobile device operating system is an open operating system, and the type of the mobile application includes a normal mobile application. At this time, the mobile application support system 10 further includes a packaging toolkit 103. The corresponding processing manner includes: packaging, by the application supply module 101, the identification information of the mobile application store, the mobile application and the packaging toolkit 103 to as a mobile application file corresponding to a respective mobile applicstoring, by the mobile application file, the identification information of the mobile application store corresponding to the mobile application or both of identification information of the mobile application and the identification information of the mobile application store corresponding to the mobile application in a mobile device memory when the mobile application file being installed, and reading, by the packaging toolkit 103, the identification information of the corresponding mobile application store from the mobile device memory, or reading the identification information of the corresponding mobile application store from the mobile device memory based on the identification information of the mobile application, to identify the mobile application store where the mobile application is, when the respective interface of the packaging toolkit 103 is called. The packaging includes but is not limited to writing the identification information of the mobile application store into a file name and renaming for the mobile application file, and/or unpacking the mobile application and writing the identification information of the mobile application store into a configuration file unpacked, and repacking related files to generate the mobile application file, wherein the related files may include the configuration file, other unpacked files and the packaging toolkit 103.

In one embodiment, the mobile device operating system type is an open operating system, and the type of the mobile application store is a type of a website added with an assisted store assistant mobile application. At this time, the mobile application support system 10 further includes a software development toolkit 102. The corresponding processing manner includes: supplying, by the application supply module 101, the mobile application to the mobile application store directly or after being signed by DRM after the mobile application integrated into various interfaces of the software development toolkit 102 without differences in mobile application store operator or mobile application store once, storing, by a store assistant mobile application of the mobile application store which is bound with a corresponding identification information of the mobile application store, the identification information of the mobile application store corresponding to the mobile application or both of identification information of the mobile application and the identification information of the mobile application store corresponding to the mobile application in a mobile device memory when installing the mobile application, and reading, by the software development toolkit 102, the identification information of the corresponding mobile application store from the mobile device memory, or reading the identification information of the corresponding mobile application store from the mobile device memory based on the identification information of the mobile application when the respective interface of the software development toolkit 102 is called, to identify the mobile application store where the mobile application is.

In one embodiment, the type of the mobile device operating system is an open operating system or a closed operating system, and the type of the mobile application is a HTML5 web page mobile application. At this time, the mobile application support system 10 further includes a software development toolkit 102. The corresponding processing manner includes: integrating the mobile application into a HTML5 application user interface of the mobile application store after the mobile application integrated into various interfaces of the software development toolkit 102, transmitting, by the HTML5 application user interface, the identification information of the mobile application store to the mobile application, acquiring, by the software development toolkit 102, the identification information of the mobile application store when the respective interface of the software development toolkit 102 is called, to identify the mobile application store where the mobile application is. The HTML5 application user interface integrated into the mobile application store includes but is not limited to a HTML5 application page implanted into the mobile application store by an iframe approach.

In one embodiment, when the mobile application store receives a download instruction and supplies the mobile application file to the corresponding user terminal, the mobile application store may initiate a request of supplying the mobile application file to the application supply module 101. The application supply module 101 may package the mobile application and he identification information of the mobile application store and/or the packaging toolkit as a mobile application file corresponding to a respective mobile application store after receiving the request, and specifically includes writing the identification information of the mobile application store into a file name and renaming for the mobile application file, or unpacking the mobile application, writing the identification information of the mobile application store to a configuration file, and repacking related files to generate the mobile application file, so that the mobile application may identify the mobile application store where the mobile application is, based on the identification information of the mobile application store. The related files include the configuration file and other unpacked files.

In one practical application scene, the mobile application store operator needs to create a mobile application store. The mobile application store operator user may access the system for creating mobile application store provided by the present disclosure for registration, open a user account (hereafter referred as operator account for the purpose of distinguish), and set related information associated with the operator account, such as name, address and bank account of the operator. The operator account and related information of the operator can be stored in a digital content library 102. The specific process of registration may use any means existing or to be developed and need not be repeated here.

Figure 13:
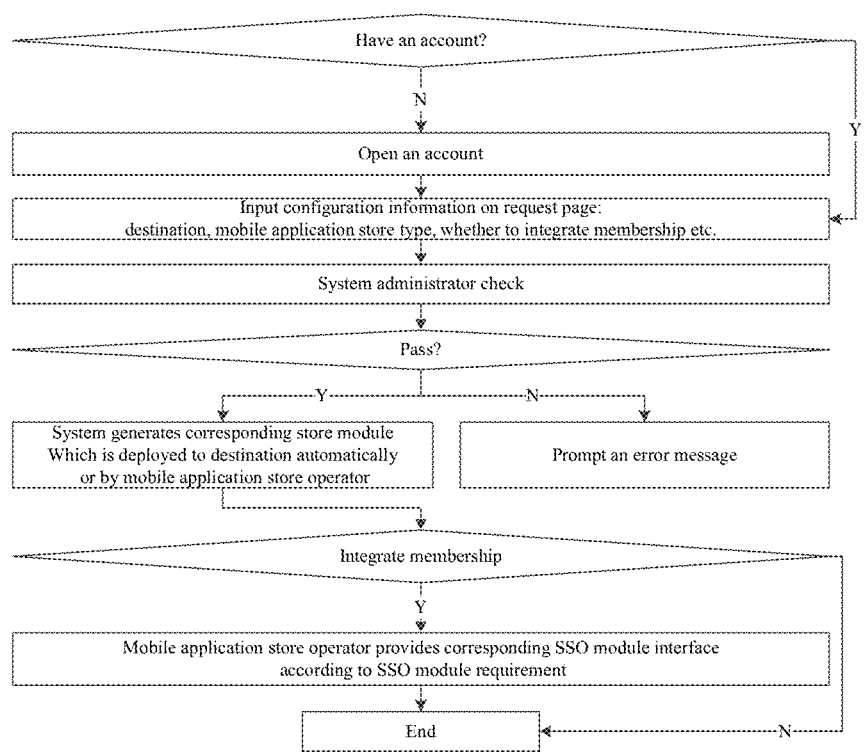
FIG. 13 is a flow diagram illuminating a process of providing configuration information of the mobile application store based on the mobile application store creation page shown in FIG. 12.

After registration, the network operator may send mobile application store creation page request information to the store creation module 201 through the registered account. The store creation module 201 may return a mobile application store creation page to the terminal where the operator account is based on the mobile application store creation page request information. FIG. 12 shows a schematic diagram illuminating a mobile application store creation page returned to the terminal where the operator account is according to one embodiment. Accordingly, FIG. 13 shows a flow diagram illuminating a process of providing configuration information of the mobile application store by a operator based on the mobile application store creation page.

After the terminal where the operator account is receives the mobile application store creation page, information related to the mobile application store to be created may be filled in the mobile application store creation page, such as a destination of the mobile application store. In the case of the operator having its own domain name, the destination may be set based on the operator's domain name accordingly, for example, http://www. operator's domain name.com, http://store. operator's domain name.com, or http://www. operator's domain name/store. In the case of the operator not having its own domain name, the destination of the mobile application store may be set based on the domain name of the mobile application store support system 20 of the present disclosure, for example, http://operator 1. the domain name of the mobile application store support system.com. As a result, the operator who has its own domain name may create a mobile application store based on its own domain name without re-registering a domain name, and the operator who does not have its own domain name may create a mobile application store without registering an independent domain name of its own.

Figure 14:
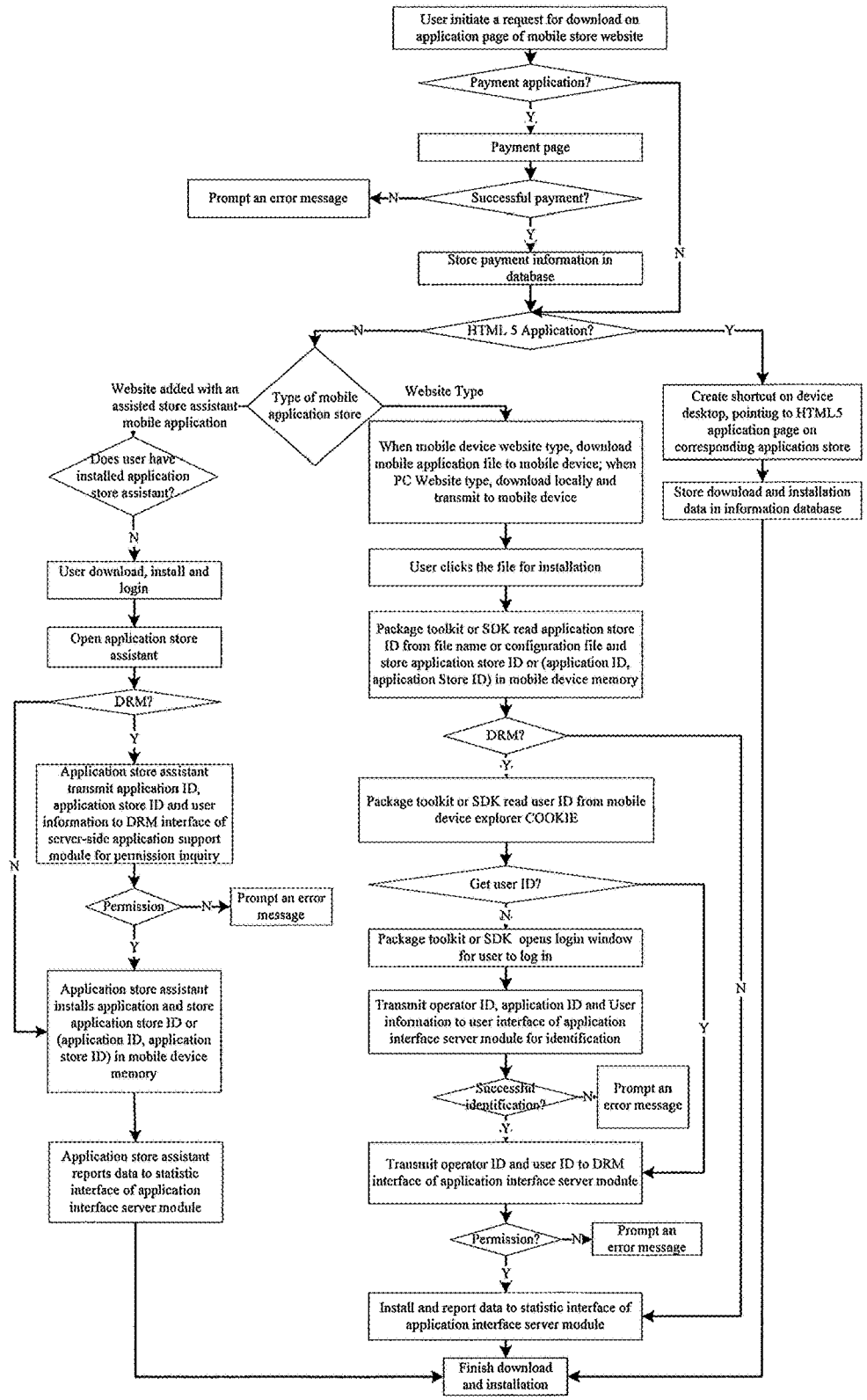
FIG. 14 is a flow diagram illuminating a process of downloading and installing a mobile application file according to one specific embodiment.

As shown in FIG. 14, in the mobile application store creation page, other configuration information related to the mobile application store may be further set, such as the type of the mobile application store, the way to supply the application, and the type of the supported mobile device operating system type. It may further include whether to integrate the store membership system or the membership system of the mobile application store operator, based on actual needs. When the store membership system or the membership system of the mobile application store operator requires to be integrated, the operator may supply a corresponding user interface as required.

After completing the setting of the configuration information related to the mobile application store, the terminal where the operator account is may send a mobile application store creation request to the mobile creation module 201. The mobile application store creation request includes configuration information related to the mobile application store. As above, the related configuration information may include any one or any combination of a destination of the mobile application store, information that type of the mobile application store is a website type, the way to provide application, the type of the supported mobile device operating system, and whether to integrate the store membership system or the membership system of the mobile application store operator.

After receiving the mobile application store creation request, the store creation module 201 may generate a mobile application store module 202 associated with the destination of the mobile application store based on the mobile application store creation request, and dispose the mobile application store module 202 to the destination of the mobile application store. In the case that the operator user uses its own domain name to supply the mobile application store, the disposing can be implemented by manual settings with the operator account, or can be implemented automatically when the operator user provides destination FTP account password information in the mobile application store creation request. The automate disposing may be implemented when the domain name of the mobile application store support system 20 of the present disclosure is used to set the corresponding destination of the mobile application store.

Then, the operator account may set the mobile application file to be released or supplied to the user from the mobile application store through the store management module 204. In one embodiment, the terminal where the operator account is may send a mobile application file information acquirement request to the store management module 204. After receiving the mobile application file information acquirement request, the store management module 204 may read the configured configuration information related to the mobile application store from the information database, and the read related configuration information may be returned to the terminal where the operator user is.

After receiving the related configuration information of the mobile application store, the terminal where the operator user may set the related information of the mobile application file to be released or supplied to the user from the mobile application store, for example changing the subject of the mobile application store, adding a mobile application file to be supplied to the user, deleting the mobile application file added to the mobile application store (pulling the added mobile application from the shelves), setting figure, content introduction and other information of the mobile application file added to the operator's own mobile application store, storing the related information of mobile application store set in the information database through the store management module 204.

After the mobile application store has been created, the user may obtain a mobile application service by accessing the mobile application store. Specifically, when accessing, the user terminal may send an access request to the mobile application store module 202. After receiving the access request, the mobile application store module 202 may acquire the corresponding mobile application file information from the mobile application file corresponding to the mobile application store module 202 and send the mobile application file information to the user terminal, based on the access request.

When the mobile application store module 202 sends the information of the mobile application file to the user terminal, different configurations may be made according to practical requirements.

In one embodiment, the mobile application store module 202 may send information of all corresponding mobile application files to the user terminal for the user to browse and view.

In another embodiment, the mobile application store module 202 may only send information of the mobile application file suitable for the type of the user terminal to the user terminal according to the type of the user terminal.

Take the type of the user terminal as Android system for example. The mobile application store module 202 may send information of the mobile application file suitable for the Android system to the user terminal. The information may include information of the mobile application in APK format and information of the HTML5 mobile application.

Take the terminal type as Iphone system for example. The mobile application store module 202 may send information of the mobile application file suitable for the Iphone system to the user terminal. Since the Iphone system is a closed operating system, it may generally include information of the HTML5 mobile application.

Take the user terminal as normal PC or other devices for example. The mobile application store module 202 may send information of the mobile application files in all formats to the user terminal for the user to select. The information may be downloaded by the user terminal and transmitted to a corresponding mobile device.

After the user checks the information of the mobile application file supplied by the mobile application store module 202, if there is information of a mobile application file which the user is interested in, a download request may be sent to the mobile application store module 202. The following description will illuminate the process of the mobile device terminal sending a download instruction to the mobile application store module 202. FIG. 14 shows a flow diagram illuminating a process of downloading and installing a mobile application file according to one specific embodiment.

After the mobile application store module 202 receives the download instruction, if the mobile application is a free application, the application may be downloaded directly. If the mobile application is a paid application, a payment page of the mobile application store may be provided to the user terminal, and the application may be downloadable after the user finishes the payment. The specific process of payment may use any means existing or to be developed and need not be repeated here. The corresponding payment information may be stored in the information database for later inquiry after the user finishes the payment. The payment information may include information of associations between the mobile application file and the identification information of mobile application store.

As a free mobile application or a paid mobile application for which the user has paid, the specific downloading and installing process the mobile application may be different, some of which will be described as below.

As shown in FIG. 14, if the supply mode of the mobile application set by the mobile application store is website type (PC website type or mobile device website type), the specific downloading and installing process may be as below.

After receiving the download instruction, the mobile application store module 202 may extract a corresponding mobile application file from the information database and send the mobile application file to the mobile device. The mobile device may download the mobile application file locally, and the user may click the mobile application file to start the installation.

During installation, the identification information of mobile application store (mobile application store ID) may be read from the configuration file of the mobile application file or from the file name of the mobile application file. The identification information of mobile application and the identification information of mobile application store may be stored in the mobile device memory in an associated form, and specifically, the identification information of mobile application (mobile application ID) and the identification information of mobile application store (mobile application store ID) may be stored in the mobile device memory in pairs for ease of recording the related data. If the user deletes the mobile application, and downloads and installs the mobile application from another mobile application store, the stored mobile application ID and mobile application store ID will be updated when reinstalling.

The above stored data (mobile application ID and mobile application store ID) indicates that the mobile application corresponding to the mobile application ID is downloaded from the mobile application store corresponding to the mobile application store ID, which helps the mobile application to judge which mobile application store the user comes from during later use of the mobile application. For example, when the user initiates a request of in-app billing, the application toolkit may find a mobile application ID and a mobile application store ID corresponding to the mobile application ID, so as to know which mobile application store the user comes from, and open a in-app billing window corresponding to the mobile application store. In the case that there is only one mobile application store created by the store creation module in the mobile device, for example, a mobile phone manufacturer creates a mobile application store of its own with the store creation module and pre-installs the mobile application store in the mobile phone, when the mobile application is installing, only the mobile application store ID may be stored, and the mobile application ID may not be stored.

If the mobile application is not provided with DRM protection, the related installation data may be reported to the application interface server module 104 of the mobile application store support system 20 to record this action of downloading and installing, after the mobile application has been installed.

If the mobile application is provided with DRM protection, the application toolkit may read the mobile application store user cookie of the explorer in the mobile device to read the user information. If the application toolkit reads the user information, the application toolkit may upload the mobile application store ID, the mobile application ID and user information to the DRM interface of the application interface server module 104, to check whether the user has permission to use the mobile application: if no permission, prompting an error message, and no longer performing installation process; and if permission, uploading the mobile application store ID, the mobile application ID and the user information to the user interface of the mobile application store support system 20 for login, and if the login fails, prompting an error message, and no longer performing installation process; if the login succeeds, installing the mobile application, and reporting the related installation data to the application interface server module 104 of the mobile application store support system 20 to record this action of downloading and installing, after the mobile application has been installed.

As shown in FIG. 14, if the type of the mobile application store is an a type of a website added with an assisted store assistant mobile application, the specific downloading and installing process may be as below.

When receiving a download instruction, the mobile application store module 202 may detect and determine whether the mobile device is installed with the corresponding store assistant mobile application 2021. The specific process of detecting and determining may use any means existing or to be developed and need not be repeated here. If the mobile device is not installed with the corresponding store assistant mobile application, the user may be prompted to download the store assistant mobile application 2021 for installation and login, and the user may open the store assistant mobile application 2021 after login.

After detecting that the mobile device has installed the corresponding store assistant mobile application 2021 or downloading and installing the store assistant mobile application 2021, the store assistant mobile application 2021 may run to perform the following processes:

determining whether the mobile application is provided with DRM protection;

if the mobile application is not provided with DRM protection, installing the mobile application through the store assistant mobile application 2021, and reporting the related installation data to the application interface server module 104 of the mobile application store support system 20 to record this action of downloading and installing, after the mobile application has been installed; and if the mobile application is provided with DRM protection, the store assistant mobile application 2021 uploading the mobile application store ID, the mobile application ID and the user information to the DRM interface of the application interface server module 104, to check whether the user has permission to use the mobile application: if no permission, prompting an error message, and no longer performing installation process; and if permission, the store assistant mobile application 2021 installing the mobile application, and the store assistant mobile application 2021 reporting the related installation data to the application interface server module 104 of the mobile application store support system 20 to record this action of downloading and installing, after the mobile application has been installed. During the installation of the mobile application, the store assistant mobile application 2021 may store the identification information of mobile application and the identification information of mobile application store the identification information of mobile application (mobile application ID) and the identification information of mobile application store in an associated form, and specifically, the identification information of mobile application (mobile application ID) and the identification information of mobile application store (mobile application store ID) may be stored in the mobile device memory in pairs to indicate that the mobile application corresponding to the mobile application ID is downloaded from the mobile application store corresponding to the mobile application store ID, which helps the mobile application to judge which mobile application store the user comes from during later use of the mobile application.

As shown in FIG. 14, if the mobile application to be downloaded is a HTML5 mobile application, a shortcut may be created on the desktop of the mobile device, and downloading and installing data related to the HTML5 mobile application may be stored in the information database to complete downloading and installing. The shortcut may point to a HTML5 application page of the mobile application store corresponding to the HTML5 mobile application, so as to record the association relationship between the HTML5 mobile application and the mobile application store, and other related information, such as payment information during the performance of the HTML5 mobile application.

Take HTML5 mobile application for example. When the HTML5 mobile application is required to be opened, the user may click the shortcut icon on the desktop of the mobile device. The link of the page of the HTML5 mobile application pointed from the shortcut icon may be open in the browser, and the HTML5 mobile application page may read the mobile application store ID and the mobile application ID from the link of the shortcut.

If the HTML5 mobile application is not provided with copyright protection, the HTML5 mobile application may be loaded directly in iframe. If the HTML5 mobile application has been integrated with the user and the decrypted information from the HTML5 application page includes user information, content of the HTML5 mobile application of the user may be loaded.

If the HTML5 mobile application is provided with copyright protection, the HTML5 mobile application page may read the user information of the mobile application store user cookie. If there is no user information, a corresponding landing page of the mobile application store may be open for the user to login. After the user logs in successfully, the HTML5 mobile application page may read the user information of the mobile application store user cookie. After the HTML5 mobile application page reads the user information, the HTML5 mobile application page may send the mobile application store ID, the mobile application ID and the user information to the DRM interface of the application interface server module 104 to inquire permission.

If no permission, an error message may be sent to the user, and the following process may be performed no longer.

In the case that there is a permission and the user information has been read, the HTML5 mobile application page may encrypt the mobile application store ID and the user information to transmit to the HTML5 mobile application in the iframe by the way of HTTP POST or GET. In the case that there is a permission and the user information has not been read, the HTML5 mobile application page may encrypt the mobile application store ID and the user information to transmit to the HTML5 mobile application in the iframe by the way of HTTP POST or GET.

Then the HTML5 mobile application may be loaded in the iframe to implement the application of the HTML5 mobile application. If the HTML5 mobile application has been integrated with the user and the decrypted information from the HTML5 application page includes user information, content of the HTML5 mobile application of the user may be loaded.

Based on the solution of the present disclosure, for other mobile applications besides the HTML5 mobile application, when the mobile application is required to be updated, the specific updating and checking process may be as below.

The mobile application may access the software development toolkit 102, and call a version interface of the software development toolkit 102 when starting the mobile application. When the user starts the mobile application, the version check of the software development toolkit 102 may be triggered. The software development toolkit 102 may transfer the current version to the version interface of the application interface server module 104 for version check. The version interface may query the information database to determine whether there is an updated version, and if there is an updated version, the user may be prompted to update the version.

Moreover, the mobile application store module 202 may further include a recommendation sub-module 2022. The recommendation sub-module 2022 may be implemented by any available way such as JS script. The recommendation sub-module 2022 may be implanted into the computer-based or mobile-based web page of the mobile application store of the mobile application store operator, to recommend the mobile application which the user may be interested in to the user through a certain algorithm, by analyzing page content, browser history of the user, and download history of the mobile application. The specific algorithm may be implement by any way available, such as a mixed recommendation algorithm combined a recommendation algorithm based on content with a recommendation algorithm based on collaborative filtering, which needs not be repeated here.

In the above description of each embodiment of the system for creating mobile application store according to the present disclosure, the mentioned open operating system is referred to a mobile device operating system which allows the user to install the mobile application downloaded from other channels (such as a mobile application store which is not provided by the operating system), for example, the existing Android, BlackBerry, Symbian etc. Correspondingly, the mentioned closed operating system is referred to a mobile device operating system which does not allow the user to install the mobile application downloaded from other channels (such as a mobile application store which is not provided by operating system) except by the way of unofficial jailbreak, for example, the existing IOS, Windows Phone etc. The normal mobile application described in each embodiment of the present disclosure is referred to a mobile application in other types besides the HTML5 web page mobile application.

According to the above system for creating mobile application store according to the present disclosure, the present disclosure further provides a method for creating mobile application store, which will be described as below in conjunction with embodiments of the method for creating mobile application store.

Example One

The method for creating mobile application store in Example One will be illuminated in the mobile application developer side, which corresponds to the system for creating mobile application store in the above Example One.

In this embodiment, the method for creating mobile application store includes:

supplying a mobile application file to a respective mobile application store, wherein the mobile application file is a mobile application file obtained from a mobile application being processed in a processing manner corresponding to types of mobile application store, supported mobile device operating system and mobile application, and then supplied to the respective mobile application store, the mobile application file includes identification information of the mobile application store, or the mobile application file is capable of acquiring the identification information of the mobile application store when the mobile application file is supplied to the mobile application store or is supplied to a mobile terminal through the mobile application store, and the mobile application identifies the mobile application store where the mobile application is, according to the identification information of the mobile application store. The time of dealing with the corresponding processing manners may be different based on requirements of practical applications, including but not limited to one or any combination of: the time of receiving the submitted mobile application, the time of creating the mobile application store and the time of initiating a download request by a user in the mobile application store. Moreover, the identification information of the mobile application store includes but is not limited to: a store ID for identifying a mobile application store with a different brand and/or different membership system.

The above corresponding processing manner may be different based on the type of the mobile device operating system, the type of the mobile application and the type of the mobile application store, and several implements are illuminated as below.

In one embodiment, the type of the mobile device operating system includes an open operating system, and the type of the mobile application includes a normal mobile application. The corresponding processing manner includes: packaging the identification information of the mobile application store and the mobile application to a mobile application file corresponding to a respective mobile application store after one time integration of the mobile application with various interfaces of the software development toolkit which are uniform for all mobile application store operators or mobile application stores, storing, by the mobile application file, the identification information of the mobile application store corresponding to the mobile application or both of identification information of the mobile application and the identification information of the mobile application store corresponding to the mobile application in a mobile device memory when the mobile application file being installed, and reading, by the software development toolkit, the identification information of the corresponding mobile application store from the mobile device memory, or reading the identification information of the corresponding mobile application store from the mobile device memory based on the identification information of the mobile application, to identify the mobile application store where the mobile application is, when one of the various interface of the software development toolkit is called; the various interfaces of the software development toolkit including but not limited to an in-app billing interface and a user interface; the packaging comprising but not limited to: writing the identification information of the mobile application store into a file name and renaming for the mobile application file, or unpacking the mobile application and writing the identification information of the mobile application store into a configuration file unpacked, and repacking related files to generate the mobile application file, wherein the related files includes the configuration file and other unpacked files In another embodiment, the type of the mobile device operating system includes an open operating system, and the type of the mobile application includes a normal mobile application. The corresponding processing manner includes: packaging the identification information of the mobile application store, the mobile application and the packaging toolkit to as a mobile application file corresponding to a respective mobile application store, storing, by the mobile application file, the identification information of the mobile application store corresponding to the mobile application or both of identification information of the mobile application and the identification information of the mobile application store corresponding to the mobile application in a mobile device memory when the mobile application file being installed, and reading, by the packaging toolkit, the identification information of the corresponding mobile application store from the mobile device memory, or reading the identification information of the corresponding mobile application store from the mobile device memory based on the identification information of the mobile application, to identify the mobile application store where the mobile application is, when the respective interface of the packaging toolkit is called; the packaging including but not limited to writing the identification information of the mobile application store into a file name and renaming for the mobile application file, and/or unpacking the mobile application and writing the identification information of the mobile application store into a configuration file unpacked, and repacking related files to generate the mobile application file, wherein the related files include the configuration file, other unpacked files and the packaging toolkit.

In another embodiment, the type of the mobile device operating system includes an open operating system, and the type of the mobile application store including a type of a website added with an assisted store assistant mobile application. The corresponding processing manner includes: supplying the mobile application to the mobile application store directly or after being signed by DRM after one time integration of the mobile application with various interfaces of the software development toolkit which are uniform for all mobile application store operators or mobile application stores, storing, by a store assistant mobile application of the mobile application store which is bound with a corresponding identification information of the mobile application store, the identification information of the mobile application store corresponding to the mobile application or both of identification information of the mobile application and the identification information of the mobile application store corresponding to the mobile application in a mobile device memory when installing the mobile application, and reading, by the software development toolkit, the identification information of the corresponding mobile application store from the mobile device memory, or reading the identification information of the corresponding mobile application store from the mobile device memory based on the identification information of the mobile application when one of the various interface of the software development toolkit is called, to identify the mobile application store where the mobile application is.

In another embodiment, the type of the mobile device operating system includes an open operating system or a closed operating system, and the type of the mobile application includes a HTML5 webpage mobile application. The corresponding processing manner includes: integrating the mobile application into a HTML5 application user interface of the mobile application store after the mobile application integrated into various interfaces of the software development toolkit, transmitting, by the HTML5 application user interface, the identification information of the mobile application store to the mobile application, acquiring, by the software development toolkit, the identification information of the mobile application store when the respective interface of the software development toolkit 102 is called, to identify the mobile application store where the mobile application is, and the HTML5 application user interface integrated into the mobile application store including but not limited to a HTML5 application page implanted into the mobile application store by an iframe approach.

In the method for creating mobile application store according to the present embodiment, the mobile application can be processed as a mobile application file corresponding to respective mobile application stores based on the type of each mobile device operating system, the type of the mobile application and the type of the mobile application store, only if the mobile application developer uploads the developed mobile application once without negotiating with the operator client of the respective mobile application store. In addition, the identification information of the corresponding mobile application store can be identified based on the mobile application file, to realize the association between the mobile application file and the mobile application store, which results in convenient for recording the related information for example the in-app billing during the user using the mobile application.

In the method of the Example One, the connections between various interfaces of the software development toolkit and/or the packaging toolkit and corresponding external system interfaces may be implemented by an application interface server module.

The connecting includes but is not limited to:
receiving, by the in-app billing interface, the identification information of the mobile application store transmitted from the software development toolkit and an in-app billing request information, calling a corresponding payment gateway based on the received identification information of the mobile application store and the in-app billing request information, receiving payment result information returned by the payment gateway, storing the payment result information to an information database and returning to the software development toolkit based on the identification information of the mobile application store, returning, by the software development toolkit, the payment result information to the mobile application so that the mobile application supplies a product or service purchased by a user to the user according the payment result information, and when the identification information of the mobile application store sent by software development toolkit and the in-app billing request information belong to an in-app billing request initiated by the user in the mobile application received by the mobile application, reading, by the software development toolkit, the identification information of a corresponding mobile application store from the mobile device memory based on the identification information of the mobile application, and transmitting, through calling the in-app billing interface of the software development toolkit.

The method of Example One further includes: receiving a mobile application submission request, the mobile application submission request comprising the mobile application and configuration information corresponding to the mobile application, storing the mobile application and the corresponding configuration information to an information database, the configuration information comprising a name of the mobile application and a type of the mobile application, and when the type of the mobile application is HTML5 web page mobile application, the mobile application submission request further comprising URL address information of the mobile application.

The method of Example One further includes: receiving a management request and managing the mobile application and related information and data of the mobile application based on the management request; the related information and data of the mobile application comprising but not limited to related information and data of the in-app billing of the mobile application in the respective mobile application store; and the management comprising but not limited to: receiving an in-app billing data report request of a respective mobile application store, reading all payment result information of corresponding mobile applications in respective mobile application stores from the information database based on the identification information of the mobile application included in the request, and generating a report.

Example Two

The method for creating mobile application store in Example Two will be illuminated in the mobile application operator side, which corresponds to the system for creating mobile application store in the above Example Four.

In this embodiment, the method for creating mobile application store may include:
providing mobile application service through respective mobile application store modules deployed on one or more destinations, the mobile application service includes: supplying the corresponding mobile application file for the sender when receiving a download instruction, the mobile application file includes the identification information of the mobile application store corresponding to the mobile application store module, or acquires the identification information of the mobile application store through the mobile application.

In one embodiment, the method of the present embodiment further includes: receiving a mobile application store creation request, the mobile application store creation request comprising mobile application store configuration information, the mobile application store configuration information comprising any one or any combination of a type of the mobile application store, a destination where the mobile application store is deployed, a supported mobile device operating system, whether the mobile application store needs to be integrated into an internet provider membership system, whether the mobile application needs to be integrated into the membership system of the mobile application store operator, and whether the mobile application needs to be integrated into the in-app billing of the mobile application store, the store creation module being further configured to generate the mobile application store module associated with the destination of the mobile application store based on the mobile application store creation request, and dispose the mobile application store module to the destination of the mobile application store, and the type of the mobile application store comprising but not limited to a website type (PC website and/or mobile device website) and a type of a website added with an assisted store assistant mobile application.

In one embodiment, the above mobile application service further includes: receiving an access request, acquiring information of a mobile application file corresponding to mobile application store module based on the access request, the type of the mobile device operating system and/or the type of the mobile application store, and sending the information of the mobile application file to a sender of the access request.

In another embodiment, the above mobile application service further includes: sending information of recommended mobile application to a user through a recommendation algorithm according to the user's historical information; the service of the mobile application store operator comprising but not limited to website, computer software and mobile application; the user's historical information comprising but not limited to content of browsed page, browsing history, historical download record of mobile applications; and the recommendation algorithm comprising but not limited to a mixed recommendation algorithm combined a recommendation algorithm based on content with a recommendation algorithm based on collaborative filtering.

The method for creating mobile application store in Example Two further includes: receiving a management request, and managing the mobile application store corresponding to the mobile application store module; the management request comprising but not limited to: inquiring in-app billing detail and/or summary information of a respective mobile application in the mobile application store corresponding to the mobile application store module, and managing a subject of the mobile application store and pulling the mobile application on/off shelves.

When the mobile application store type is the type of a website added with an assisted store assistant mobile application, the method for creating mobile application store in Example Two further includes: creating a store assistant mobile application corresponding to the mobile application store module. The store assistant mobile application is bound with the identification information of the corresponding mobile application store. The store assistant mobile application stores the identification information of the mobile application store corresponding to the mobile application or the identification information of the mobile application and the identification information of the corresponding mobile application store to the mobile device memory when installing the mobile application, and when a related interface is called through the mobile application, a software development toolkit integrated with the mobile application reads the identification information of the corresponding mobile application store from the mobile device memory, or reads the identification information of the corresponding mobile application store from the mobile device memory based on the identification information of the mobile application when one of the various interface of the software development toolkit is called, to identify the mobile application store where the mobile application is When the mobile application store is set to require the mobile application and/or the mobile application store to be integrated into a mobile application store operator membership system, the method for creating mobile application store in Example Two further includes: supplying user related service. In this embodiment, the user related service includes any one or any combination of:

transmitting user related service request information to a user interface of software development toolkit and/or packaging toolkit when the mobile application initiates a request for user related service to the user, reading, by the software development toolkit and/or packaging toolkit, the identification information of the corresponding mobile application store from the mobile device memory, based on the identification information of the mobile application, transmitting the identification information of the mobile application store and the received user related service request information to a user interface of the SSO module, transmitting, by the SSO module, the user related service request information to a SSO module interface of a corresponding mobile application store operator based on the identification information of the mobile application store, and returning a result from the SSO module interface to the software development toolkit and/or packaging toolkit, returning, by the software development toolkit and/or packaging toolkit, the result to the mobile application, and the mobile application supply user related service to the user based on the returned result; the user related service request comprises any one or any combination of login, login authentication, user information inquiry and user registration; and transmitting, by the mobile application store module, a user related service request information to the SSO module or the SSO module interface of a corresponding mobile application store operator when the mobile application store initiates a request for user related service, and supply a user related service to a user based on the returned result; and the user related request comprising any one or any combination of login, login authentication, user information inquiry and user registration.

Example Three

The method for creating mobile application store in Example Three will be illuminated in combination of the mobile application developer side and the mobile application operator side, which corresponds to the system for creating mobile application store in the above Example Nine.

The method for creating mobile application store in Example Three may include both the method for creating mobile application store in Example One and the method for creating mobile application store in Example Two, and need not be repeated here.

The embodiments are chosen and described in order to explain the principles of the disclosure and their practical application so as to activate those skilled in the art to utilize the disclosure and respective embodiments, and are not intended to limit the scope of the present disclosure in any way. It would be understand by those skilled in the art that respective changes and modifications can be made to the embodiments described herein without departing from the scope and spirit of the present disclosure. Accordingly, the scope of the present disclosure is defined by the appended claims rather than the foregoing description and the exemplary embodiments described therein.

The invention claimed is:

1. A method for operating a mobile application store, comprising:
    processing a mobile application in a processing manner corresponding to a type of the mobile application store and a supported mobile device operating system;
    supplying the mobile application file to the mobile application store,
    wherein the mobile application file includes identification information of the mobile application store, or the mobile application file is capable of acquiring the identification information of the mobile application store, and
    the mobile application identifies a location of the mobile application to the mobile application store based on the identification information of the mobile application store, and
    wherein the type of the mobile device operating system is an open operating system,
    the type of the mobile application is a normal mobile application, and
    the processing manner comprises:
    packaging the identification information of the mobile application store and the mobile application to a mobile application file corresponding to a respective mobile application store using a uniform software development toolkit,
    storing the identification information of the mobile application store corresponding to the mobile application in a mobile device memory when the mobile application file is installed, and
    reading, by the software development toolkit, the identification information of the corresponding mobile application store from the mobile device memory, to identify the mobile application store when an interface of the software development toolkit is called;
    wherein:
    the interface of the software development toolkit comprises at least one of an in-app billing interface or a user interface; and
    the packaging comprises at least one of:
        writing the identification information of the mobile application store into a file name and renaming for the mobile application file, or
        unpacking the mobile application and writing the identification information of the mobile application store into a configuration file unpacked, and repacking related files to generate the mobile application file, wherein the related files comprise the configuration file and other unpacked files, and
    wherein the method for operating the mobile application store further comprises:
    connecting, by the application interface server module, various interfaces of a software development toolkit and/or a packaging toolkit to corresponding external system interfaces, wherein the connection comprises:
    receiving, by the in-app billing interface, the identification information of the mobile application store transmitted from the software development toolkit and in-app billing request information,
    calling a payment gateway based on the received identification information of the mobile application store and the in-app billing request information,
    receiving payment result information returned by the payment gateway, storing the payment result information to an information database and returning to the software development toolkit based on the identification information of the mobile application store,
    returning, by the software development toolkit, the payment result information to the mobile application so that the mobile application supplies a product or service purchased by a user to the user according to the payment result information, and
    when the identification information of the mobile application store sent by software development toolkit and the in-app billing request information belong to an in-app billing request initiated by the user in the mobile application received by the mobile application, and
    reading, by the software development toolkit, the identification information of a corresponding mobile application store from the mobile device memory based on the identification information of the mobile application, and transmitting the identification information, through calling the in-app billing interface of the software development toolkit.

2. The method for operating the mobile application store according to claim 1, wherein:
    the type of the mobile device operating system is an open operating system,
    the type of the mobile application is a normal mobile application, and
    the processing manner comprises:
    packaging the identification information of the mobile application store and the mobile application to a mobile application file corresponding to a respective mobile application store using a packaging toolkit
    storing the identification information of the mobile application store corresponding to the mobile application in a mobile device memory when the mobile application file is installed, and
    reading, by the packaging toolkit, the identification information of the corresponding mobile application store from the mobile device memory to identify the mobile application store when an interface of the software development toolkit is called;
    wherein:
    the interface of the packaging toolkit comprises at least one of an in-app billing interface or a user interface; and
    the packaging comprises at least one of:
        writing the identification information of the mobile application store into a file name and renaming for the mobile application file, or unpacking the mobile application and writing the identification information of the mobile application store into a configuration file unpacked, and repacking related files to generate the mobile application file, wherein the related files comprise the configuration file and other unpacked files.

3. The method for operating the mobile application store according to claim 1, wherein:
the type of the mobile device operating system is an open operating system,
the type of the mobile application is a normal mobile application, and
the processing manner comprises:
packaging the identification information of the mobile application store and the mobile application to a mobile application file corresponding to a respective mobile application store,
storing, in the mobile application file, the identification information of the mobile application store corresponding to the mobile application in a mobile device memory when the mobile application file is installed, and
reading, by a packaging toolkit, the identification information of the corresponding mobile application store from the mobile device memory to identify the mobile application store;
wherein:
the interface of the software development toolkit comprises at least one of an in-app billing interface or a user interface; and
the packaging comprises at least one of:
writing the identification information of the mobile application store into a file name and renaming for the mobile application file, or
unpacking the mobile application and writing the identification information of the mobile application store into a configuration file unpacked, and repacking related files to generate the mobile application file, wherein the related files comprise the configuration file, other unpacked files, and the packaging toolkit.

4. The method for operating the mobile application store according to claim 1, wherein:
the type of the mobile application is a HTML5 webpage mobile application, and
the processing manner comprises:
integrating the mobile application into a HTML5 application user interface of the mobile application store,
transmitting, by the HTML5 application user interface, the identification information of the mobile application store to the mobile application,
acquiring the identification information of the mobile application store when an interface of a software development toolkit is called, to identify the mobile application store, and
integrating the mobile application into the HTML5 application user interface of the mobile application store by an iframe approach.

5. The method for operating the mobile application store according to claim 1, further comprising:
receiving a mobile application submission request, wherein the mobile application submission request comprises the mobile application and configuration information corresponding to the mobile application,
storing the mobile application and the corresponding configuration information to an information database,
wherein the configuration information comprises a name of the mobile application and a type of the mobile application, and
when the type of the mobile application is HTML5 web page mobile application, the mobile application submission request further comprises URL address information of the mobile application.

6. The method for operating the mobile application store according to claim 1, further comprising:
receiving a management request and managing the mobile application and related information and data of the mobile application based on the management request,
wherein the related information and data of the mobile application comprise in-app billing information, and
the management comprises at least one of:
receiving an in-app billing data report request of a respective mobile application store,
reading all payment result information of corresponding mobile applications in respective mobile application stores from the information database based on the identification information of the mobile application included in the request, and
generating a report.

7. A method for operating a mobile application store, comprising:
providing mobile application service through one or more mobile application store modules deployed on one or more destinations, wherein the mobile application service includes: supplying a corresponding mobile application file to the sender when receiving a download instruction, the corresponding mobile application file includes the identification information of the mobile application store, or acquiring the identification information of the mobile application store through the mobile application; and
receiving a mobile application store creation request, wherein the mobile application store creation request comprises:
mobile application store configuration information, wherein the mobile application store configuration information includes at least one of:
a type of the mobile application store,
a destination where the mobile application store is deployed,
a supported mobile device operating system, whether the mobile application store needs to be integrated into an internet provider membership system,
whether the mobile application needs to be integrated into the membership system of the mobile application store operator, and
whether the mobile application needs to be integrated into the in-app billing of the mobile application store,
wherein the store creation module is further configured to generate the mobile application store module associated with the destination of the mobile application store based on the mobile application store creation request, and provide the mobile application store module to the destination of the mobile application store, and
the mobile application store includes a website
wherein the method for operating the mobile application store further comprises:
receiving a management request, wherein the management request comprises at least one of:
a request for an in-app billing detail and/or summary information of a respective mobile application in the mobile application store, instructions for managing a subject of the mobile application store, or a request to remove the mobile application from the mobile application store;

wherein the mobile application service further:

receiving an access request, acquiring information regarding the mobile application file based on the access request, the type of the mobile device operating system and/or the type of the mobile application store, and sending the information of the mobile application file to a sender of the access request;

creating a store assistant mobile application corresponding to the mobile application store module, wherein:

the store assistant mobile application is associated with the identification information of the corresponding mobile application store, the store assistant mobile application stores the identification information of the mobile application store to the mobile device memory when installing the mobile application, and when a related interface is called through the mobile application, a software development toolkit integrated with the mobile application reads the identification information of the mobile application store from the mobile device memory based on the identification information of the mobile application; and the mobile application service further comprises:

recommending a service of the mobile application store operator, and sending information of a recommended mobile application to a user through a recommendation algorithm according to the user's historical information, and wherein:

the service of the mobile application store operator comprises at least one of a website, computer software or a mobile application;

the user's historical information comprises at least one of a content of a browsed page, a browsing history, or a historical download record of mobile applications, and the recommendation algorithm comprising a mixed recommendation algorithm, comprising a recommendation algorithm based on content and a recommendation algorithm based on collaborative filtering.

8. The method for operating the mobile application store according to claim 7, further comprising:

supplying a user related service when the mobile application store is configured to require the mobile application and/or the mobile application store to be integrated into a mobile application store operator membership system;

wherein the user related service to the user comprises:

transmitting a user related service request to a user interface of a software development toolkit and/or a packaging toolkit when the mobile application initiates the user related service request, reading, by the software development toolkit and/or the packaging toolkit, the identification information of the mobile application store from the mobile device memory, transmitting the identification information of the mobile application store and the received user related service request to a user interface of a SSO module, transmitting, by the SSO module, the user related service request to a SSO module interface of a corresponding mobile application store operator based on the identification information of the mobile application store, and returning a result from the SSO module interface to the software development toolkit and/or packaging toolkit, returning, by way of the software development toolkit and/or the packaging toolkit, the result to the mobile application, and the mobile application supply user related service to the user based on the returned result; the user related service request comprises one or more of a login, a login authentication, a user information inquiry or a user registration; and transmitting, by the mobile application store module, the user related service request to the SSO module interface or the SSO module of a corresponding mobile application store operator when the mobile application store initiates the user related service request, and supply a user related service to a user based on the returned result.

9. The method for operating the mobile application store according to claim 7, further comprising:

supplying a mobile application file to a respective mobile application store, wherein the mobile application file is a mobile application file obtained by processing a mobile application in a processing manner based on a type of mobile application store, a type of mobile device operating system and a type of the mobile application, wherein the mobile application file comprises identification information of the mobile application store, or the mobile application file being capable of acquiring the identification information of the mobile application store when the mobile application file is supplied to the mobile application store or is supplied to a mobile terminal through the mobile application store, and the mobile application identifies the mobile application store where the mobile application is, based on the identification information of the mobile application store.

10. The method for operating the mobile application store according to claim 9, wherein:

the type of the mobile device operating system is an open operating system, the type of the mobile application is a normal mobile application, and the processing manner comprises:

packaging the identification information of the mobile application store and the mobile application to a mobile application file corresponding to a respective mobile application store using a uniform software development toolkit, storing the identification information of the mobile application store corresponding to the mobile application in a mobile device memory when the mobile application file is installed, and reading, by the software development toolkit, the identification information of the corresponding mobile application store from the mobile device memory, to identify the mobile application store when an interface of the software development toolkit is called;

wherein:

the interface of the software development toolkit comprises at least one of an in-app billing interface or a user interface; and the packaging comprises at least one of:
>writing the identification information of the mobile application store into a file name and renaming for the mobile application file, or
>unpacking the mobile application and writing the identification information of the mobile application store into a configuration file unpacked, and repacking related files to generate the mobile application file, wherein the related files comprise the configuration file and other unpacked files.

11. The method for operating the mobile application store according to claim 10, further comprising:
>connecting, by the application interface server module, various interfaces of the software development toolkit and/or a packaging toolkit to corresponding external system interfaces, wherein the connection comprises:
>receiving, by the in-app billing interface, the identification information of the mobile application store transmitted from the software development toolkit and in-app billing request information,
>calling a payment gateway based on the received identification information of the mobile application store and the in-app billing request information,
>receiving payment result information returned by the payment gateway, storing the payment result information to an information database and returning to the software development toolkit based on the identification information of the mobile application store,
>returning, by the software development toolkit, the payment result information to the mobile application so that the mobile application supplies a product or service purchased by a user to the user according to the payment result information, and
>when the identification information of the mobile application store sent by software development toolkit and the in-app billing request information belong to an in-app billing request initiated by the user in the mobile application received by the mobile application,
>reading, by the software development toolkit, the identification information of a corresponding mobile application store from the mobile device memory based on the identification information of the mobile application, and transmitting the identification information, through calling the in-app billing interface of the software development toolkit.

12. The method for operating the mobile application store according to claim 10, further comprising:
>receiving a mobile application submission request, wherein the mobile application submission request comprises the mobile application and configuration information corresponding to the mobile application,
>storing the mobile application and the corresponding configuration information to an information database, wherein the configuration information comprises a name of the mobile application and a type of the mobile application, and
>when the type of the mobile application is HTML5 web page mobile application, the mobile application submission request further comprises URL address information of the mobile application.

13. The method for operating the mobile application store according to claim 10, further comprising:
>receiving a management request and managing the mobile application and related information and data of the mobile application based on the management request, wherein the related information and data of the mobile application comprise in-app billing information, and the management comprises at least one of:
>receiving an in-app billing data report request of a respective mobile application store,
>reading all payment result information of corresponding mobile applications in respective mobile application stores from the information database based on the identification information of the mobile application included in the request, and
>generating a report.

14. The method for creating mobile application store according to claim 9, further comprising:
>the type of the mobile device operating system is an open operating system,
>the type of the mobile application is a normal mobile application, and
>the processing manner comprises:
>packaging the identification information of the mobile application store and the mobile application to a mobile application file corresponding to a respective mobile application store using a packaging toolkit
>storing the identification information of the mobile application store corresponding to the mobile application in a mobile device memory when the mobile application file is installed, and
>reading, by the packaging toolkit, the identification information of the corresponding mobile application store from the mobile device memory to identify the mobile application store when an interface of the software development toolkit is called;
>wherein:
>the interface of the packaging toolkit comprises at least one of an in-app billing interface or a user interface; and
>the packaging comprises at least one of:
>>writing the identification information of the mobile application store into a file name and renaming for the mobile application file, or
>>unpacking the mobile application and writing the identification information of the mobile application store into a configuration file unpacked, and repacking related files to generate the mobile application file, wherein the related files comprise the configuration file and other unpacked files.

15. The method for operating the mobile application store according to claim 9, further comprising:
>the type of the mobile device operating system is an open operating system,
>the type of the mobile application is a normal mobile application, and
>the processing manner comprises:
>packaging the identification information of the mobile application store and the mobile application to a mobile application file corresponding to a respective mobile application store,
>storing, in the mobile application file, the identification information of the mobile application store corresponding to the mobile application in a mobile device memory when the mobile application file is installed, and
>reading, by a packaging toolkit, the identification information of the corresponding mobile application store from the mobile device memory to identify the mobile application store;
>wherein:
>the interface of the software development toolkit comprises at least one of an in-app billing interface or a user interface; and the packaging comprises at least one of:
  writing the identification information of the mobile application store into a file name and renaming for the mobile application file, or
  unpacking the mobile application and writing the identification information of the mobile application store into a configuration file unpacked, and repacking related files to generate the mobile application file, wherein the related files comprise the configuration file, other unpacked files, and the packaging toolkit.

16. The method for operating the mobile application store according to claim 9, wherein:
  the type of the mobile application is a HTML5 webpage mobile application, and
  the processing manner comprises:
    integrating the mobile application into a HTML5 application user interface of the mobile application store,
    transmitting, by the HTML5 application user interface, the identification information of the mobile application store to the mobile application,
    acquiring the identification information of the mobile application store when an interface of a software development toolkit is called, to identify the mobile application store, and
    integrating the mobile application into the HTML5 application user interface of the mobile application store by an iframe approach.

* * * * *